June 6, 1967 B. A. PHILLIPS 3,323,323
ABSORPTION GENERATOR

Filed Oct. 22, 1965 3 Sheets-Sheet 2

June 6, 1967  B. A. PHILLIPS  3,323,323
ABSORPTION GENERATOR
Filed Oct. 22, 1965  3 Sheets-Sheet 3
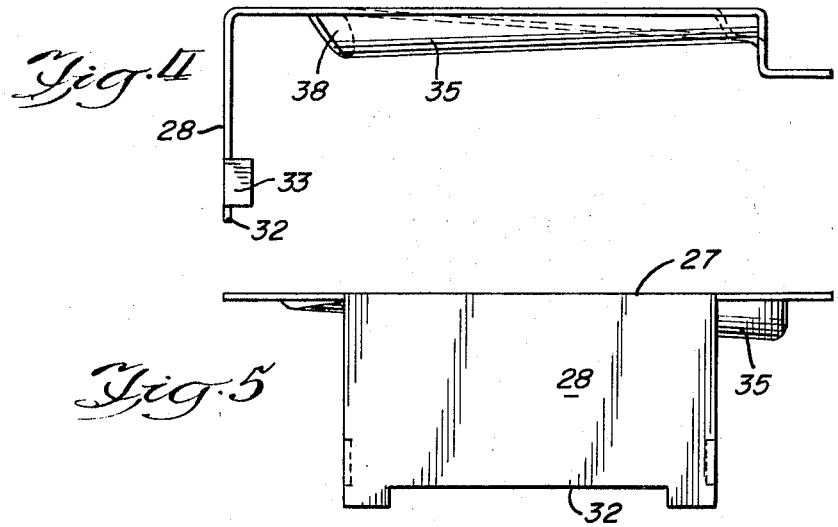
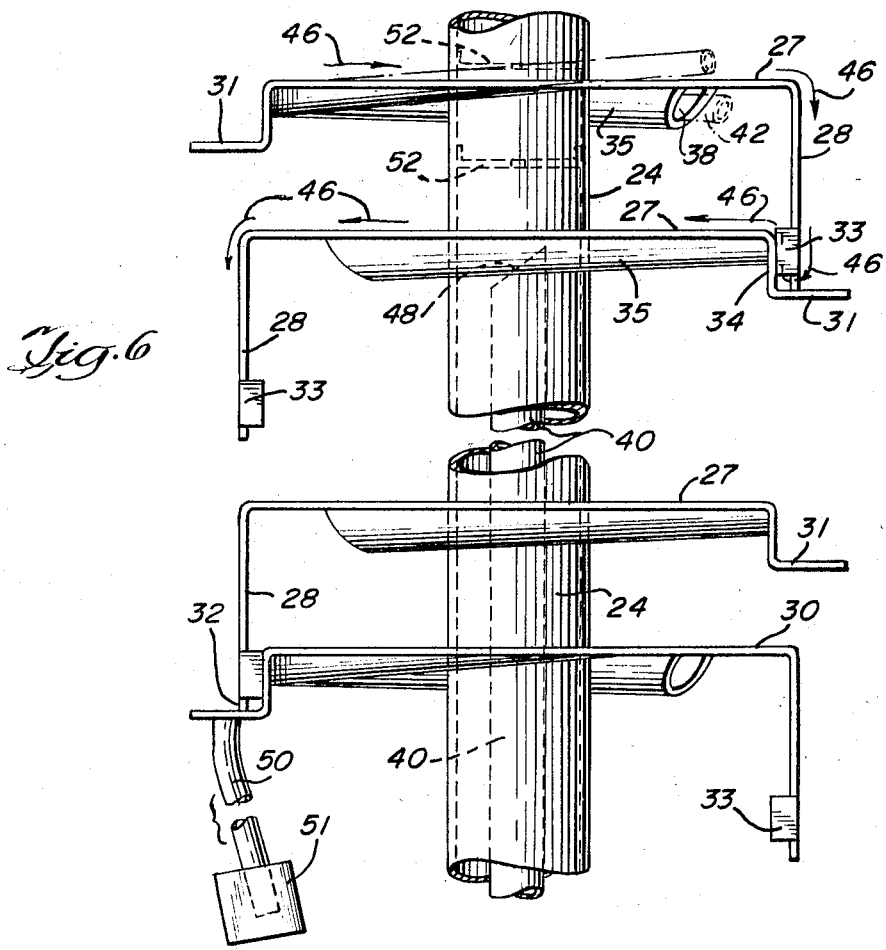

United States Patent Office 3,323,323
Patented June 6, 1967

3,323,323
ABSORPTION GENERATOR
Benjamin A. Phillips, Benton Harbor, Mich., assignor to Whirlpool Corporation, a corporation of Delaware
Filed Oct. 22, 1965, Ser. No. 502,186
13 Claims. (Cl. 62—497)

This invention relates to a generator for an absorption refrigeration system.

The generator of this invention is used as a part of an absorption refrigeration system of the type disclosed in the copending application of John Roeder, Jr., Ser. No. 498,235 filed Oct. 20, 1965, and assigned to the same assignee as the present application. As in this as in other absorption refrigeration systems, refrigerant gas such as ammonia is absorbed in a liquid such as water in an absorber portion of the system and the refrigerant gas is then driven from the refrigerant-absorption liquid solution for condensing into liquid refrigerant which is then used to provide the desired refrigeration. This invention is concerned with an improved generator for driving the absorbed refrigerant gas from the solution by the application of heat.

One of the features of this invention therefore is to provide an improved generator for an absorption refrigeration system.

Another feature of the invention is to provide such a generator in which rich liquid and weak liquid within the generator are in heat transfer contact with each other.

Other features and advantages of the invention will be apparent from the embodiment illustrated in the accompanying drawings.

Of the drawings:

FIGURE 4 is a side elevational view of the plate of FIGURE 3.

FIGURE 5 is a side elevational view of the plate but taken from the left side of FIGURE 4.

FIGURE 6 is a fragmentary detailed side elevational view of a subcombination portion of the generator.

FIGURE 7 is a fragmentary arcuate sectional view taken substantially along the line 7—7 of FIGURE 3.

FIGURE 8 is a sectional view taken substantially along the line 8—8 of FIGURE 7.

FIGURE 9 is a fragmentary, diagrammatic side elevation view in vertical section of a generator embodying a modification of the invention.

FIGURE 10 is a fragmentary, diagrammatic side elevation view in vertical section of another modification of the invention.

Figure 1:
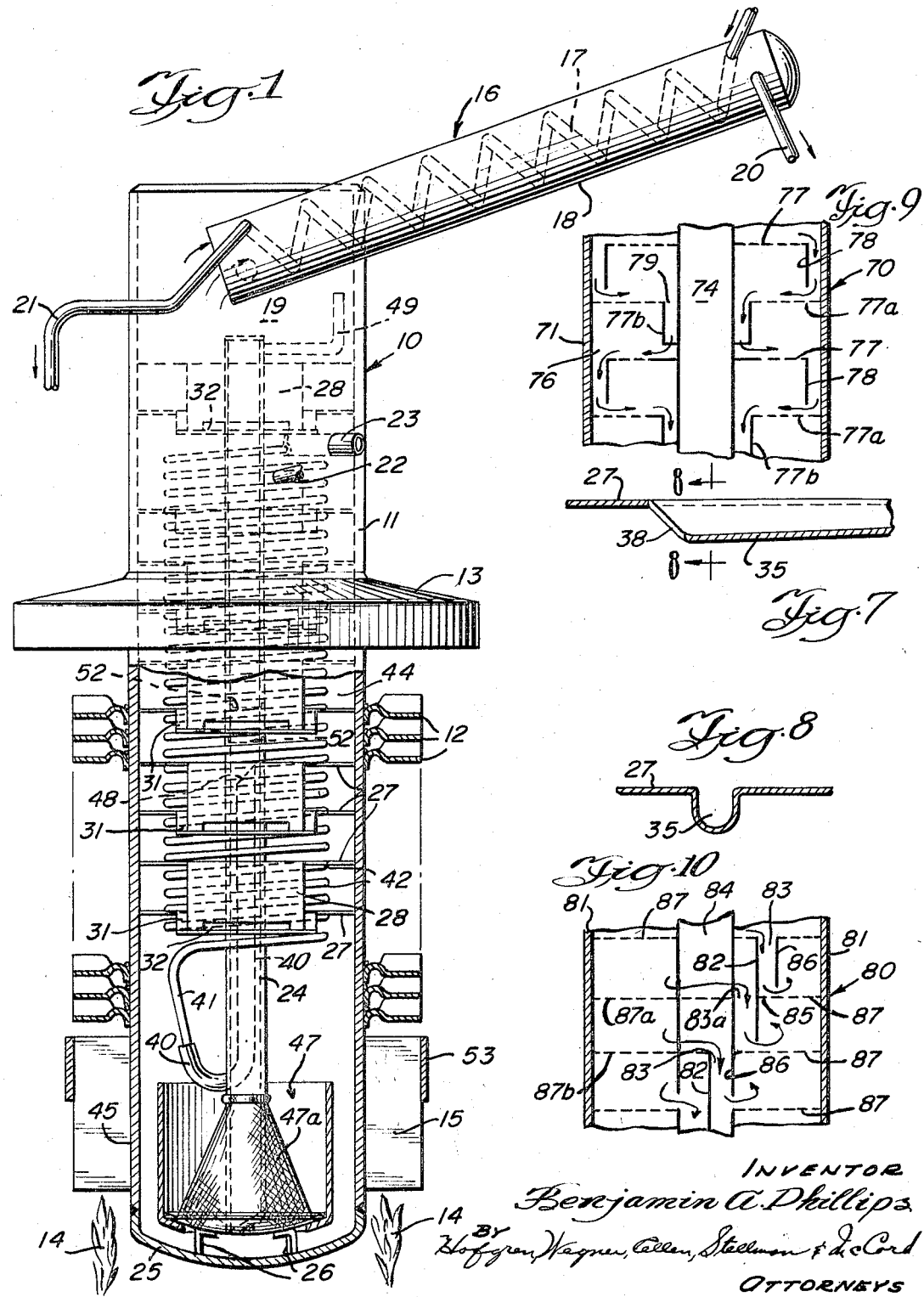
FIGURE 1 is a side elevational view with the bottom part thereof being in vertical section of a generator embodying the invention.
Figure 2:
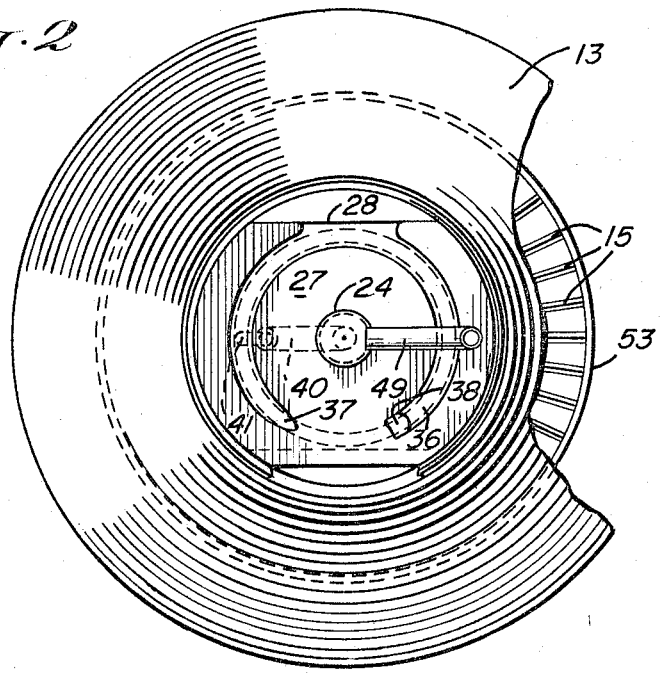
FIGURE 2 is a plan view of the generator of FIGURE 1 with the top removed, the top heat exchanger omitted and with portions broken away, all for clarity of illustration.

The generator 10 illustrated in the accompanying drawings comprises a generally cylindrical vertical shell 11 provided on its lower end with spaced heat transfer fins 12. Above the fins and extending outwardly from the shell 11 is a shield 13. The bottom of the shell 11 is adapted to be heated, as indicated diagrammatically at 14, as by a circle of gas flame. Immediately above the flame and beneath the fins 12 is a plurality of spaced vertically extending and outwardly projecting heat transfer fins 15.

As is explained in the above noted Roeder application, projecting outwardly and upwardly from the top of the shell 10 is a heat exchanger 16 having an internal helical coil 17 for purifying the refrigerant vapor and preheating rich liquid on its way to the generator 10. Through the outer tube 18 flows heated absorbent refrigerant vapor mixture from the upper vapor space 19 of the generator for condensation and rectification. This absorbent refrigerant vapor mixture flows from the upper end of the tube 18 through a pipe 20 on its way to the condenser. Thus the heat exchanger 16 preheats the rich liquid on its way to the generator by the heat of condensation of absorbent-refrigerant vapor as the last bit of absorbent vapor is condensed out of the refrigerant vapor by the cooling of the rich liquid tube.

Rich liquid from the outlet pipe 21 from the heat exchanger 16 after further heating via heat exchange with the absorber portion of the system (not shown) enters the generator at a top portion thereof as indicated by pipe 22.

The rich liquid entering the generator is converted to refrigerant gas and weak liquid. In the illustrated embodiment the weak liquid exits by way of a pipe 23 also located in the top portion of the generator 10.

Extending upwardly substantially centrally within the shell 11 is a tube 24 which is spaced from the bottom 25 of the shell 11 by means of a strainer assembly 47 which includes an 80 mesh stainless steel wire cloth strainer 47a and which is provided with a plurality of mounting brackets 26. Vertically spaced along the axial tube 24, as shown most clearly in FIGURE 6, are a plurality of rectifier plates 27. Each plate 27 has a depending leg 28 that is spaced inwardly from the circular periphery 29 of the plate and thus inwardly of the shell 11. Each plate above the lowermost plate 30 has the bottom of its leg 28 received in a cavity 31 in the next lower plate with this cavity formed by a downwardly and outwardly bent flange portion at the periphery of the plate immediately beneath the leg 28 of the next above plate. As is shown in FIGURE 5, the bottom of each depending leg 28 is cut out, as indicated at 32, to provide a liquid flow opening positioned adjacent the bottom of the next lower plate cavity 31. The bottom of each depending leg 28 is provided with side flanges 33, one of which is on each side thereof engaging the vertical wall 34 of the cavity 31 to space the bottom of the leg 28 properly within the cavity.

Figure 3:
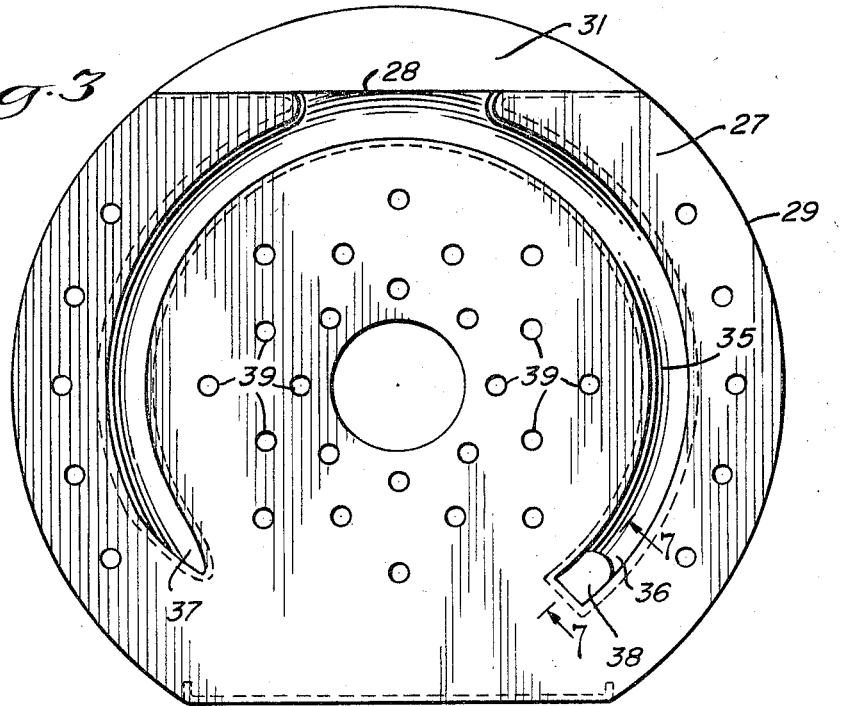
FIGURE 3 is a plan view of one of the vertically spaced rectifier plates within the generator.

Each rectifier plate 27 is also provided with an arcuate substantially concentric groove 35 tapering in depth from one deep end 36 to the opposite shallow end 37. As can be seen in FIGURE 3 this groove extends approximately 270° and is provided with an opening 38 at the one end 36 thereof. Each plate 27 is provided with a plurality of spaced openings 39 for the upward passage of refrigerant vapor through the generator 10 into the top space 19 for flow out the tube 18 in the manner previously described.

Extending upwardly within the central tube 24 and substantially concentric therewith is the entrance end of a weak liquid pipe 40. This entrance end is joined to a helical pipe 41 so that the two comprise a weak liquid conduit exiting from the generator at the previously identified pipe 23. This is disclosed and claimed in E. P. Whitlow application Ser. No. 543,844, filed April 20, 1966, and assigned to the same assignee.

The helical weak liquid pipe 41 extends upwardly through the generator 10 with a plurality of individual coils 42 located between each pair of adjacent rectifier plates 27. The sloped grooves 35, each having its entrance end opening 38, provide for passage of the helix through and between the assembly of rectifier plates 27. In the illustrated embodiment the helix has 30 coils 42 with 3 coils being located between each adjacent pair of rectifier plates 27.

The absorption generator or generator-analyser of this invention is a boiler and plate distillation column which operates flooded throughout its height, i.e., the liquid phase is the continuous phase with the vapor existing in discrete pockets within the liquid or as bubbles passing through the liquid from one vapor pocket to the next. In contrast, conventional distillation columns have limited liquid storage on each plate and the vapor phase can properly be called the continuous phase.

The "liquid phase" column of this invention has the following advantages:

(1) Compactness; i.e., reduced height for a given amount of rectification.

(2) A liquid storage volume that is considerably greater than in conventional systems, thus eliminating the hazard of "dry boiling."

(3) Good heat transfer characteristics from the weak liquid coil which is immersed uniformly throughout the height of the column.

FIGURE 1 shows a presently preferred embodiment of the invention. It is apparent that the column is flooded with liquid at least to rich liquid inlet pipe 22 and the vapor exists in pockets underneath each plate, passing upward from plate to plate by bubbling through the liquid. The plates or "trays" serve first to trap and establish the vapor pockets and to form the bubbles. The trays are placed much closer together than the trays of conventional analyser columns.

To ensure proper performance of the system the vapor flow must be controlled so that it occurs smoothly or quietly and uniformly. It may not be allowed to channel or surge. This flow of the vapor must occur in such a way that the liquid flow from plate to plate may occur unidirectionally and uniformly with no tendency to oscillation or surging of any kind to substantially eliminate vertical mixing of the liquid in the continuous vertical phase. Further, the liquid flow downwards from plate to plate must take place through conduits of limited cross section so that the liquid velocity through these conduits is sufficient to prevent mixing between the liquids on the two plates either through diffusion or through the natural turbulence occurring as a result of the boiling and flow of vapor bubbles.

This control of vapor flow upward and liquid flow downward is obtained by first regulating the flow of vapor from plate to plate so that it occurs continuously and at a relatively constant rate. The constancy of the rate must be such that the liquid flow at all points in the column is always positive and sufficient to maintain backward diffusion at an insignificant level.

The control of vapor flow is accomplished by the selection of the diameter and number of vapor holes in the plates. Hole diameters may vary over an appreciable range. The lower limit is defined by factors such as the surface tension of the liquid and must be such that the vapor can blow through all holes reproducibly at an acceptable vapor head not greater than the desired height of the vapor pockets. A vapor hole diameter of about 0.098" presently would appear to be a reasonable lower limit.

The number of holes is then established so that the head required to flow the vapor rate encountered equals the height of vapor pockets desired—½" to 1" appears to perform well. Hole quantity and diameter can be varied up the height of the column to suit the concentrations existing at each height—but it may always be more practical to choose a diameter and number which represents a satisfactory compromise throughout the height of the column. The final adjustments may best be done experimentally.

In the illustrated arrangement the cross sections of liquid phase are all relatively large and would result in vertical mixing due to the small unavoidable and yet desirable stirring of the liquid between the vapor pockets. To minimize this mixing the liquid connecting passage between trays is made as small in cross section as feasible without requiring significant loss of head at the nominal liquid flow rate. Because each succeeding tray downward is at a higher temperature than the boiling point of the one above it is possible to produce boiling in the down comer due to heat transfer through its walls—to prevent this the down comer is protected by a surrounding blanket of liquid of the composition of the upper tray as explained below. This is accomplished as shown in FIGURE 6 by the flow arrows 46.

To provide high system efficiency by recovering in the analyser sensible heat in the weak liquid the weak liquid from the bottom of the distillation column as carried up through the trays 27 in heat exchange with the boiling liquid therein by the coiled tube 41 which is passed through the trays by piercing the hole 38 only slightly larger than the coil 42 diameter in a formed section in the tray such that the tube coiling upward at only a slight slope nevertheless passes through the metal of the tray more or less at right angles to it as can be seen from the plane of the hole 38 in FIGURE 7.

Rich liquid enters the generator through the previously identified rich liquid pipe 22 and the shell 11 is normally substantially filled with liquid to above this pipe. The rich liquid travels downwardly through the rectifier portion 44 of the generator toward the bottom boiler portion 45 where the heat is applied, as illustrated at 14, and where the bottom heat conducting fins 12 and 15 are located. In the movement of the liquid downwardly in the generator the liquid flows over the edge of each plate in the open segment formed by the depending leg or down comer 28, as indicated by the arrows 46 in FIGURE 6. The liquid then is directed by the bottom of the cavity 31 to the next lower plate 27 through the flange opening 32 and back across the next lower plate 27 to its depending leg 28. Thus, the down comer or leg 28 is protected by a surrounding blanket of liquid indicated by the arrows 46 of the composition of the upper plate or tray. The liquid then reverses to flow over the next lower plate in a similar fashion. In this manner, although the shell 11 is substantially filled with liquid up to the rich liquid pipe 22, the liquid in its flow from the top of the generator toward the bottom boiler portion 45 is directed back and forth across the shell 11 by the plates 27 so as to lengthen the path of travel and increase the time which it takes the liquid to travel from the top of the liquid column to the bottom of the generator.

This back and forth travel is further ensured by having the plates fit tightly against the inside surface of the shell 11. Thus, in one embodiment there was only about 0.005 inch between the edge of each plate on this inner surface.

By the time the liquid reaches the boiler portion 45 of the generator the rich liquid has been converted into weak liquid and the liquid refrigerant such as ammonia with has been driven off by heat as from the flame 14 has passed upwardly through the liquid column and through the rectifier plates 27 by way of the plurality of holes 39 into the upper space 19. With this arrangement, there is a rectifier action between the upwardly passing refrigerant gas and the downwardly descending liquid.

The weak liquid from the boiler portion 45 of the generator enters the bottom of the tube 24 by way of strainer assembly 47 with its metal screen 47a which intercepts any foreign material such as metal particles, corroded metal and the like. This weak liquid is thereby admitted to the upper opening 48 of the weak liquid pipe 40 in order to enter the helical coil pipe 41 and flow upwardly through the series of individual coils 42. The weak liquid leaves the generator through the previously described exit pipe 23. With this arrangement, there is highly efficient heat transfer between the relatively hot weak liquid flowing upwardly through the helix 41 and the rich liquid flowing downwardly back and forth across the rectifier plates 27 in the manner previously described toward the boiler portion bottom 45 of the generator.

The upper end of tube 24 is provided with an upwardly extending vent tube 49 into the space 19 at the top of the generator 10.

The lowermost rectifier plate 30 is provided with a down comer tube 50, as shown in FIGURE 6, extending to adjacent the bottom 25 of the generator. This tube 50 (omitted from FIGURE 1 for clarity) is enclosed at its lower end by an open topped cap 51 which permits downward flow of liquid toward the bottom of the shell 11 while the cap 51 inhibits interference of the vapor with the descending liquid.

Within the tube 24 above the sloped upper end 48 thereof there is provided a pair of closure members 52 each having orifices therein for equalizing pressure within the tube by functioning to retard reabsorption of refrigerant vapor above the liquid level in the tube 24 back into the weak liquid within the tube. The upper end 48 of the weak liquid pipe 40 is cut at an angle so that this upper opening cannot be blocked by a closure member if it were improperly installed against the upper end of the pipe 40. The height of this upper end of the pipe 40 which in the illustrated embodiment is between a third and a fourth rectifier plate 27 from the bottom of the assembly of plates determines the liquid level in the column during periods when the generator is not operating. For ease of start-up, this liquid level should be at the maximum height, all other things considered.

As pointed out earlier, the exterior of the generator shell 11 adjacent the bottom thereof is provided with bottom vertical fins 15 and disc fins 12 thereabove. The tops of the vertical fins 15 at the outer edge thereof may be provided with an encircling ring 53.

As explained earlier, the vertically spaced substantially horizontal rectifier plates 27 divide the liquid filled interior of the generator into a plurality of zones with each zone being bounded by a pair of adjacent plates. The heat is applied at the bottom of this series of zones, as indicated by the flames 14, in order to drive off refrigerant gas which bubbles up through the liquid column into the upper space 19 and in its travel passes through the holes 39 in the rectifier plates. Thus, the zones bounded by the vertically spaced rectifier plates 27 contain liquid progressively weaker in dissolved refrigerant from adjacent the top of the series of plates to the lower portion 45 where the heat is applied. The refrigerant gas from the top space 19 flows out the upwardly sloped tube 18, as previously described, and as the major portion of this tube 18 is exposed to atmospheric air the tube also acts as an air cooled condenser to condense water vapor from the outflowing refrigerant gas with this condensed water then flowing back into the top of the generator 10.

As can be seen from the above description, the generator 10 contains at all times a large quantity of liquid. Thus, in one embodiment the liquid within the shell 11 was never less than about 7 liters in volume. The inlet end 48 for the weak liquid flow from the generator is at an elevated position so that during periods of non-operation the weak liquid flows out the pipe until it is about the middle of this entrance end 48. Thus, the weak liquid pipe serving as a drain pipe ensures that the relatively large volume of liquid is present at all times. As the various liquid zones defined by the series of rectifier plates 27 are of progressively weaker concentration in dissolved refrigerant when progressing toward the bottom of the generator, the boiling points of the lower zones are greater than those of the higher zones. With this arrangement the greatest amount of heat is applied to those zones of liquid having the highest boiling points.

Referring now to FIGURE 9, there is shown therein a modification of the invention in which a generator 70, having a liquid containing shell 71 includes an axial tube 74 on which are vertically spaced in alternating fashion a plurality of rectifier plates 77 and 77a. Each plate 77 has a depending skirt portion 78, defining a liquid flow opening 76 at the side of the plate 77. Each plate 77a has a centrally located liquid flow opening 79 defined by a depending collar portion 77b. The liquid rich in dissolved refrigerant flows radially across the plates and downward through the liquid openings as indicated by the arrows in FIGURE 9. All other details of generator 70 are like those of generator 10.

FIGURE 10 illustrates another modification providing means for flowing liquid rich in dissolved refrigerant circumferentially across succeeding plates. The FIGURE 10 modification comprises a generator 80 having a liquid containing shell 81 which includes an axial tube 84 on which are vertically spaced a plurality of rectifier plates 87. Each plate 87 has a depending leg portion 82 which extends from the downstream side of a flow opening 83 formed in plate 87 down to the next lower plate 87a at a portion 85 of it which is upstream from the flow opening 83a in next lower plate 87a. The plates 87 may also include a depending leg 86 to further define liquid flow opening 83. The leg 86 is shorter than leg 82 so that liquid can flow between leg 86 and the surface of plate 87 circumferentially around the column to the angularly displaced opening 83 in the next lower plate as indicated by the arrows in FIGURE 10. All details of generator 80 not described in detail above are like those of generator 10.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. A generator for an absorption refrigeration system, comprising: a liquid containing shell; a series of vertically spaced plates in said shell; means in alternate plates providing a substantially centrally located liquid flow opening in said alternate plate; means in the intermediate plate between each pair of said alternate plates providing a liquid flow opening adjacent a side portion of said intermediate plate; and means for flowing said liquid downwardly and substantially radially across succeeding plates by way of said liquid flow openings.

2. A generator for an absorption refrigeration system, comprising: a liquid containing shell; a series of vertically spaced plates in said shell; means providing a liquid flow opening in each plate arcuately spaced from its preceding plate opening; means providing a depending conduit means in each plate from its said flow opening to a point short of the next lower plate and arcuately upstream of the flow opening in said next lower plate; and means for flowing said liquid arcuately across downwardly succeeding plates by way of said plate openings and conduit means.

3. A generator for an absorption refrigeration system, comprising: a liquid containing shell; a series of vertically spaced plates in said shell having gas flow openings in each plate and liquid flow openings at opposite sides of successive plates; means for flowing liquid rich in dissolved refrigerant into said shell at an elevated entrance and downwardly across succeeding plates and through said liquid openings at a rate such that said vertically spaced plates are immersed in liquid; means for applying heat at a lower portion of said shell to drive off dissolved refrigerant in the form of a gas and convert said rich liquid to liquid weak in dissolved refrigerant, the gas thereby bubbling up through the liquid between the plates by way of said gas flow openings in said plates; and conduit means for said weak liquid extending through said series of plates and through the liquid between the plates in heat exchange contact with said rich liquid that is between the plates and that is flowing across said plates.

4. The generator of claim 3 wherein said conduit means comprises a substantially vertical helix within said shell.

5. The generator of claim 3 wherein said conduit means is in a substantially vertical helix within said shell, said helix having a plurality of coils between each pair of adjacent plates.

6. A generator for an absorption refrigeration system, comprising: a liquid containing shell; a series of vertically spaced plates in said shell having liquid flow openings therein; means for flowing liquid rich in dissolved refrigerant downwardly across succeeding plates and through said liquid openings; means for applying heat at a lower portion of said shell to drive off dissolved refrigerant in the form of a gas and convert said rich liquid to liquid weak in dissolved refrigerant; rich liquid conduit means extending downwardly from a lower one of said plates to an area within said shell adjacent said heat applying means; and shield means to inhibit entry of said gas into said conduit means.

7. A generator for an absorption refrigeration system, comprising: a liquid containing shell; a series of vertically spaced plates in said shell immersed in said liquid having liquid flow openings therein adjacent opposite edge portions of successive plates; and means for flowing liquid rich in dissolved refrigerant downwardly back and forth across succeeding plates and through said liquid openings, each said plate having a depending leg on one side over which liquid flows to the next lower plate.

8. The generator of claim 7 wherein the plates above the lowermost each has its said leg received in a cavity in the next plate, said legs and cavities located on alternate sides of successive plates.

9. The generator of claim 8 wherein each leg has liquid flow passage means within each said cavity.

10. A generator for an absorption refrigeration system, comprising: a liquid containing shell; a series of vertically spaced plates in said shell having liquid flow openings therein adjacent opposite edge portions of successive plates, the lower plates in said shell being immersed in said liquid so that said lower plates divide said liquid into a plurality of zones; means for flowing liquid rich in dissolved refrigerant downwardly from adjacent the top of said series of plates through successively lower zones; means for applying heat at a lower portion of said shell to drive off dissolved refrigerant in the form of a gas and convert said rich liquid to liquid weak in dissolved refrigerant, said plurality of zones thereby containing liquid progressively weaker in dissolved refrigerant from adjacent the top of said series of plates to said lower portion; rich liquid conduit means extending downwardly from a lower one of said plates to an area within said shell adjacent said heat applying means; and shield means to inhibit entry of said gas into said conduit means.

11. A generator for an absorption refrigeration system, comprising: a liquid containing shell; a series of vertically spaced plates in said shell having liquid flow openings therein adjacent opposite edge portions of successive plates, the lower plates in said shell normally being immersed in a body of said liquid so that said lower plates divide said liquid into a plurality of zones; means for flowing liquid rich in dissolved refrigerant downwardly from adjacent the top of said series of plates through successively lower zones; and means for applying heat at a lower portion of said shell to drive off dissolved refrigerant in the form of a gas and convert said rich liquid to liquid weak in dissolved refrigerant, said plurality of zones thereby containing liquid progressively weaker in dissolved refrigerant from adjacent the top of said series of plates to said lower portion.

12. In an absorption refrigeration system, a flooded column generator comprising: a liquid containing shell; a series of vertically spaced plates in said shell having liquid flow openings and vapor flow openings therein so that the column may be flooded with liquid and the vapor can exist in pockets underneath each plate and pass upward from plate to plate by bubbling through the liquid; means for flowing liquid rich in dissolved refrigerant downwardly back and forth across succeeding plates by way of said liquid openings; means for applying heat at a lower portion of said shell to drive off dissolved refrigerant in the form of a vapor and convert said rich liquid to liquid weak in dissolved refrigerant, said vapor thereby passing upwardly in said shell through said vapor flow openings countercurrently to and in contact with said rich liquid; and means for transferring said weak liquid through said series of plates in heat exchange contact with said rich liquid flowing across said plates.

13. In an absorption refrigeration system, a flooded column generator as claimed in claim 12 wherein there is a depending leg forming a downcomer, defining the liquid flow opening in each of the respective plates, and means for surrounding the downcomer with liquid of the composition of liquid above the plate from which the leg depends, thereby to prevent boiling in the downcomer due to heat transfer through its walls.

References Cited
UNITED STATES PATENTS

| | | | |
|---|---|---|---|
| 1,532,399 | 4/1925 | Gibbs | 62—497 |
| 1,613,628 | 1/1927 | Platen et al. | 62—497 |
| 2,241,621 | 5/1941 | Shoeld | 62—497 X |

LLOYD L. KING, *Primary Examiner.*